(12) United States Patent
Isaacson et al.

(10) Patent No.: US 9,158,778 B2
(45) Date of Patent: Oct. 13, 2015

(54) TECHNIQUES FOR CONTENT SERVICES

(75) Inventors: Scott Alan Isaacson, Woodland Hills, UT (US); Jason Taylor, Lehi, UT (US); Haripriya Srinivasaraghavan, Bangalore (IN); Mandhakini Subramanian, Chennai (IN); Ravi Kumar, Bangalore (IN); Manoj Madhavan, Coimbatore (IN); Pooja Gada, Gulbarga (IN)

(73) Assignee: Novell, Inc., Provo, UT (US)

( * ) Notice: Subject to any disclaimer, the term of this patent is extended or adjusted under 35 U.S.C. 154(b) by 808 days.

(21) Appl. No.: 12/870,456

(22) Filed: Aug. 27, 2010

(65) Prior Publication Data

US 2012/0054594 A1 Mar. 1, 2012

(51) Int. Cl.
*G06F 17/00* (2006.01)
*G06F 17/30* (2006.01)
*H04L 12/18* (2006.01)

(52) U.S. Cl.
CPC .... *G06F 17/30058* (2013.01); *G06F 17/30873* (2013.01); *G06F 17/30893* (2013.01); *H04L 12/1827* (2013.01)

(58) Field of Classification Search
CPC ............ G06F 17/2247; G06F 17/3089; G06F 17/30893
USPC .......................................................... 715/234
See application file for complete search history.

(56) References Cited

U.S. PATENT DOCUMENTS 6,605,120 B1 * 8/2003 Fields et al. .................. 715/239
8,086,460 B2 * 12/2011 Da Palma et al. .......... 704/270.1
2004/0085354 A1 5/2004 Massand
2004/0111639 A1 * 6/2004 Schwartz et al. ............. 713/201
2006/0173985 A1 * 8/2006 Moore .......................... 709/223
2006/0218476 A1 9/2006 Gombert
2007/0271502 A1 11/2007 Bedi et al.
2009/0013262 A1 1/2009 Hamaguchi
2009/0193035 A1 7/2009 Benayon
2009/0249224 A1 10/2009 Davis
2010/0043049 A1 * 2/2010 Carter et al. ...................... 726/1

OTHER PUBLICATIONS

Shaw, et al., "Web-Style Multimedia Annotations", published Aug. 1, 2007, Recent Work, School of Information, US Berkely, 10 pages.*
Tilkov, "A Brief Introduction to REST", InfoQ article posted on Dec. 10, 2007, p. 1-28, retrieved from http://www.infoq.com/articles/rest-introduction.*
Khare, The Anatomy of an URL: Internet-Scale Namespaces, Part I, Sep. 1, 1999, p. 1-8.*
Cormany, "Speaking UNIX: It is all about the inode. Learn how the UNIX file system manages files" Jun. 10, 2008, p. 1-9.*
Berners-Lee, Network Working Group Request for Comments: 2396, "Uniform Resource Identifiers (URI): Generic Syntax" Aug. 1998, p. 1-28.*
"Overview—Benefits—Sharepoint 2010—Why Use SharePoint 2010?", https://sharepoint.microsoft.com/en-us/product/benefits/Pages/default.aspx, (2010), 2 pages.
Callaghan, B., "WebNFS Client Specification", Network Working Group, Request for Comments: 2054, http://tools.ietf.org/rfc/rfc2054.txt, (Oct. 1996), 15 pages.

* cited by examiner

*Primary Examiner* — Amelia Tapp
(74) *Attorney, Agent, or Firm* — Schwegman Lundberg & Woessner, P.A.

(57) ABSTRACT

Techniques for content services are provided. Documents are managed from their native storage locations. Access to portions of the documents is provided via separate addressable references. Principals access and annotate the portions of the documents remotely. Identity and policy restrictions are enforced against access from the native storage locations.

19 Claims, 17 Drawing Sheets

TECHNIQUES FOR CONTENT SERVICES

BACKGROUND

Most collaboration tools support access to documents, but almost always, end users are forced to "upload" or "attach" documents into the data storage area of the collaboration service. There are several disadvantages to this situation as it exists in the industry.

Firstly, uploading a document creates a copy of the document: one copy (referred to as "A") is on the original storage medium, and the other copy (referred to as "B") is located in the collaboration service being used. For example, if a first user (referred to as "X") has a document (A) on the local hard drive of X's laptop and X logs into a collaboration service to share A, then X must also upload A from X's hard drive into the collaboration service's document storage area (or workspace) as copy B, thereby leaving a copy (A) on X's hard drive and a second copy (B) in the collaboration service's workspace area.

Secondly, collaboration documents leave the Governance Risk Management and Compliance (referred to as "GRC") environment of the end-user's source area, which can be problematic from a legal standpoint for an enterprise. For example, suppose a document (A) is on a file server and then an end user uploads a copy (B) into a collaboration service, such as Google Wave®. Once that file (A) leaves the file server, it leaves the context of audit, policy, control, accounting, and enterprise storage reporting. Moreover, if A gets deleted off of the file server, the corporate tools that monitor and maintain corporate data, often can no longer find or report on the file. Further, if A is or has content that is out-of-policy, A is often now outside the control of enterprise storage management tools once A enters the collaboration service's storage area as a copy B.

Thirdly, when documents leave their native environments the back up and virus protection services offered by their native source storage services are lost. So, if a document leaves a mapped drive server, it is no longer backed up or checked for anti-viruses as it once was once that document is located in the collaboration environment.

Thus, once documents leave the original source environment, they can be copied, and forwarded, which essentially creates multiple versions of the document and it is not easy to discover which one of the copied documents is the most recent version of the document. Accordingly, versioning is compromised. Also, all access control methodologies used on the document are made void, since a received copy of the document can freely forwarded to others around the Internet.

SUMMARY

In various embodiments, techniques for content services are presented. More specifically, and in an embodiment, a method for content services is provided. Specifically, a request for a document is received over a network connection from a principal. The document is parsed from its native storage environment into portions, each portion having a separate network addressable reference. Access to the document is provided via the network addressable references to the principal. Also, identity and policy restrictions are enforced against the principal and against the access to the document.

DETAILED DESCRIPTION

A "resource" includes a user, service, system, device, directory, data store, groups of users, combinations of these things, etc. A "principal" is a specific type of resource, such as an automated service or user that acquires an identity. A designation as to what is a resource and what is a principal can change depending upon the context of any given network transaction. Thus, if one resource attempts to access another resource, the actor of the transaction may be viewed as a principal.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc.

A "processing environment" defines a set of cooperating computing resources, such as machines, storage, software libraries, software systems, etc. that form a logical computing infrastructure. A "logical computing infrastructure" means that computing resources can be geographically distributed across a network, such as the Internet. So, one computing resource at network site X and be logically combined with another computing resource at network site Y to form a logical processing environment.

Various embodiments of this invention can be implemented in existing network architectures. For example, in some embodiments, the techniques presented herein are implemented in whole or in part in the Novell® network and proxy server products, operating system products, cloud-based products or services, directory-based products and other products and/or services distributed by Novell®, Inc., of Waltham, Mass.

Also, the techniques presented herein are implemented in machines, such as processor or processor-enabled devices. These machines are configured to specifically perform the processing of the methods and systems presented herein. Moreover, the methods and systems are implemented and reside within a non-transitory and computer-readable or processor-readable storage media and processed on the machines (processing devices) configured to perform the methods.

Of course, the embodiments of the invention can be implemented in a variety of architectural platforms, devices, operating and server systems, and/or applications. Any particular architectural layout or implementation presented herein is provided for purposes of illustration and comprehension only and is not intended to limit aspects of the invention.

It is within this context that embodiments of the invention are now discussed within the context of FIGS. 1-17.

Figure 1:
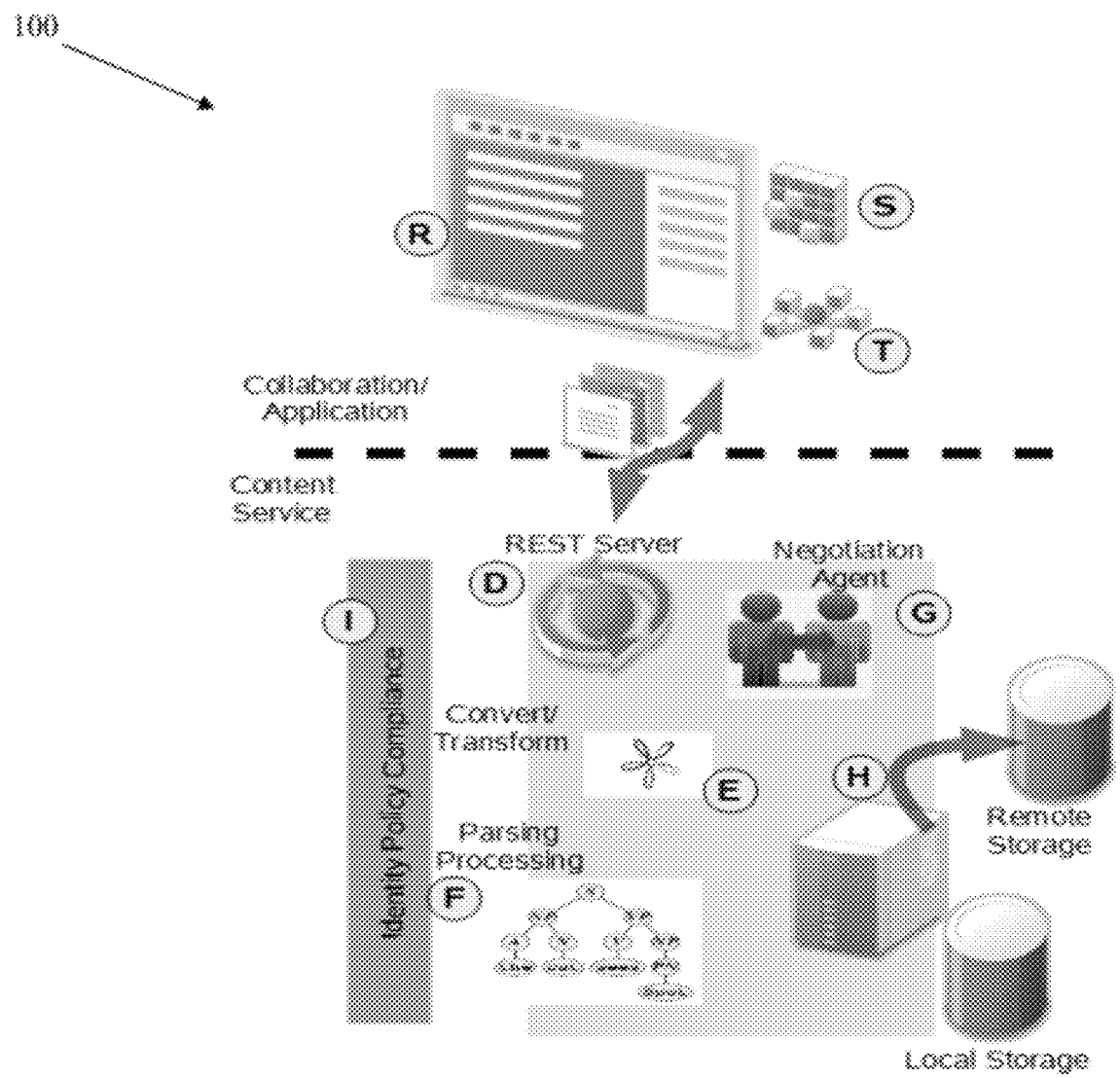
FIG. 1 is a diagram of components and interactions for a content service system, according to an example embodiment.

FIG. 1 is a diagram of components and interactions for a content service system 100, according to an example embodiment. The content service system 100 is implemented in a machine-accessible and computer-readable storage medium as instructions that execute on one or more processors (machines, computers, processors, etc.). The machine is specifically configured to process the content service system 100. Furthermore, the content service system is operational over and processes within a network. The network may be wired, wireless, or a combination of wired and wireless.

The components of the content service system 100 include a Representational State Transfer (REST) server D; a convert/transform agent E; a parsing/processing agent F; a negotiation agent G; a data and storage access agent H, and identity policy compliance data I. The content service system 100 can also include one or more of: an application user interface (UI) such as a browser R; a pluggable gadget S; and/or an event and monitor robot T. Each of these will now be discussed in turn.

The REST server supports a RESTful protocol architecture. Moreover, the REST (also referred to herein as "RESTful") server accepts File Transfer Protocol (FTP) and Hypertext Transfer Protocol (HTTP) commands, such as GET, PUT, POST, and/or DELETE operations for Create Read Update and Delete (CRUD) operations on files. Request and response data are presented in structured formats, such as JavaScript Object Notation (JSON) or eXtensible Markup Language (XML), which then allows RESTful services to embed file content and Uniform Resource Identifiers (URI's) into the responses.

The convert/transform agent is software instructions that reside on a non-transitory machine-readable storage medium and executes on the REST server. The REST server configured to execute the convert/transform agent. The convert/transform agent supports the conversion and the transformation from one file format to another file format, such as Microsoft WORD ".doc" or ".docx" format to HTML or from OpenOffice ".sxw" to OpenOffice ".odt," etc.

The parsing/processing agent is software instructions that reside on a non-transitory machine-readable storage medium and executes on the REST server. Again, the REST server configured to execute the parsing/processing agent. The parsing/processing agent parses documents and creates an abstract tree representation of data files that can be addressed at a finer granularity than just the typical file boundaries. The parsing/processing agent also adds metadata, annotations, and/or comments to original files. Some operations of the parsing/processing agent include server-side splitting of the content into independently addressable entities by assigning RESTful endpoints to each portion of the content. This frees the client side of transactions from understanding the semantics of the document and from understanding how to split up and parse complex files. Instead, the client side of the transactions just needs to invoke partial content RESTful URI's. This approach is extremely useful and powerful, especially in the areas of multiple user access.

The negotiation agent is software instructions that reside on a non-transitory machine-readable storage medium and executes on the REST server. Again, the REST server configured to execute the negotiation agent. The negotiation agent resolves the "best" option between "what is wanted" and "what is possible." This is done using Multipurpose Internet Mail Extensions (MIME) types. For example, suppose a client asks for data as application/text data but the data is stored as an application/Portable Document Format (PDF) file. If the conversion/transform agent does not have the ability to convert from PDF to text, then the data request is rejected. However, if the conversion/transform agent can perform the translation, then the negotiation agent determines that it can satisfy the data requests and so the transaction is successful.

The data and storage access agent is software instructions that reside on a non-transitory machine-readable storage medium and executes on the REST server. Again, the REST server configured to execute the data and storage access agent. The data and storage access agent knows how to access data on the file system or by using file access protocols for remote storage (such as NetWare Core Protocol (NCP), Common Internet File System (CIFS), Network File System (NFS), Apple Filing Protocol (AFP), FTP, Web-based Distributed Authoring and Versioning (WebDAV), etc.). The data and storage access agent can perform simple operations, such as a file system read or write call that is specific to a programming language, such as C, Java, Python, etc. In other cases, the data and storage access agent can perform more complex operations, such as commands for a remote file system access protocol. The data and storage access agent supports versioning of updates, which is useful when the document is maintained under some version control system, such as Social Venture Network (SVN)/Subversion.

The entire REST server as a whole is wrapped with identity, policy, and compliance data. Each principal (end user or automated process) has an identity and policy determines who is allowed to do what. The compliance component makes sure that an audit trail is maintained and that local policy is within the allowances of global policy. Embodiments herein also foresee that identity might come from federation of multiple identity providers (such as Google Wave®, Novell Pulse®, eDirectory®, Active Directory®) or server-specific identity services such as Unique Identifier (UID), Linux User Management (LUM), or digital certificates. Embodiments herein support fine grained access controls, which is a vast improvement over email attachments or forwards where there is a complete loss of access control to the document. Techniques herein allow for end-to-end access controls, which can be strictly enforced, since the content is not copied out of the enterprise data management environment; it is accessed in that environment.

The content service system 100 can also include an application UI, such as a browser. This is the front-end or end-user facing interface of the content service system 100. The UI asks for data in a form that it can understand and at a granularity that makes most sense of its current context. For example, the UI might ask for a whole document or parts of a document (paragraphs, pages, areas, sections, etc.) in HTML, text, or even a native format such as and OpenOffice Text document (".odt").

The content service system 100 can also include a pluggable gadget. Again, the pluggable gadget is software that resides in a non-transitory computer-readable medium and executes on a processor or processor-enabled device. The pluggable gadget knows how to specifically use the content service REST interface to get and put, create and delete information. In a Google Wave implementation, this is a window that provides a visual presentation of the interactive information from the content service.

The content service system 100 can also include an event and monitor robot. The event and monitor robot is software that resides in a non-transitory computer-readable medium and executes on a processor or processor-enabled device. This is a component that watches for data changes by either the client or the RESTful server. If the client makes changes in terms of in-line edits, then the new information is written back to the content service. If the new information is in the form of comments around the data, then that information is pushed back to the content service as a comment (rather than as an in-line edit) that gets written back to the native format as a comment or annotation.

The content service system 100 includes a variety of Application Programming Interfaces (APIs), such as some RESTful APIs. When using RESTful APIs, every state of the application is identified as resource and every operation as a link between resources. Hence by this definition some of the resource identified are things, such as but not limited to what follows herein.

If Directory (collection of files) is taken as a single resource this would take different states at different points in time so suppose a call to the directory resource at point of time: t1 (t=time) as rd1 (rd=resource directory state) and resource at time t2 as rd2 . . . etc. so the directory can have states like:

rd1—may be the state during creation;
rd2—state after adding file;
rd3—state after deleting file;
rd4—state after modifying files;
etc.

So, the same file can be at different states at different points of time and based on the request method on the resource, the corresponding operations are performed. The same kind of arguments hold good for a file also so files will also have states like:

rf1 (rf=resource file state)—newly created files without content;
rf2—file after adding new content;
rf3—file after modifying of the content; and
rf4—file after deletion of the content.

Resources include volumes, collection of directories, collection of files and directories, etc.

Here is an example of how this works using a state transition interface:

Create File
http POST (http:\\oes2\vol1\543367)---->Created (rf1) under directory represented by 543367
http PUT (http:\\oes2\vol1\543368\append)--->Appended Content (rf2) (a shortcut for modify at end)
http PUT (http:\\oes2\vol1\543367\)--->Modified content (rf3)

Every resource is identified by a URI and basic operations targeted are read, delete, create and update.

```
Read Full
    C (client) ----------GET (http:\\oes2\vol1\543367)------------> S (server)
    C <-------------------200 OK (data)-------------------S (data in http content)
Read Partial
    C (client) --GET (http:\\oes2\vol1\543367\startpara\x\endpara\7)------> S (server)
    C <--------------------200 OK (data)------------------------- S
Delete
    C ---------DELETE (http:\\oes2\vol1\543367)--------------> S
    C <------------200 OK (optional data )-------------------- S
Create
    C ------------POST (http:\\oes2\vol1\543366)--------------> S
    C <-----------------201 CREATED---------------------------- S
Update Full
    C -----------POST (http:\\oes2\vol1\543368)---------------> S
    C <-------------------200OK /204 NO CONTENT----------------- S
Update Partial
    C -POST (http:\\oes2\vol1\543368\startline\x\endline\y)--> S
    C <-------------------200OK /204 NO CONTENT----------------- S
```

Embodiments herein also foresee multiple styles for URIs of file resources for opaque IDs (e.g., inode), transparent IDs (e.g., file-name path), and the like.

With opaque IDs, if the content is moved, then the URI remains the same. With transparent IDs, if the content is moved, then the URI changes too. Either approach has its advantages and disadvantages, but both are acceptable approaches from a REST perspective.

Embodiments herein can include a variety of implementations to effectuate the teachings presented herein. Some of these implementation scenarios are now presented.

JSON Implementation Structures

With a JSON approach, RESTful operation payloads are implemented with JSON. In still another approach XML can be used for the RESTful operation payloads. Many other syntaxes could be used in the RESTful operations as well.

Below is one example set of JSON structures for communicating between the client and server using the techniques presented herein.

```
GET-full content
REQUEST -- plain text
REPLY -- {"type":"file","content":"this is data"}
http://83.222.226.38:8080/cs/var/tmp/example.odt/
GET-partial content
REQUEST -- plain text
```

```
REPLY -- {"type":"file","content":"this is data"}
http://83.222.226.38:8080/cs/var/tmp/example.odt/startline/2/endline/3/
PUT- INSERT
REQUEST -- plain text
REPLY -- { "type":"file","content": 0}
http://83.222.226.38:8080/cs/var/tmp/example.odt/startline/2/insert
PUT- REPLACE
REQUEST -- plain text
REPLY -- { "type":"file","content": 0}
http://83.222.226.38:8080/cs/var/tmp/example.odt/startline/2/endline/3/upda
te
PUT-comment
REQUEST -- {"type":"comment","author":"mandy","content":"comment from
mandy"}
REPLY -- { "type":"file","content": 0}
http://83.222.226.38:8080/cs/var/tmp/example.odt/startline/2/endline/3/comm
ent
Directory Single JSON
{
    "type":"directory",
    ".eclipseproduct":"E:\\.eclipseproduct",
    "readme":"E:\\readme",
    "removedconf.txt":"E:\\removedconf.txt",
    "plugins":"E:\\plugins"
}
Nested JSON Directory
{
    "type":"directory",
    "content":{
        ".eclipseproduct":"E:\\.eclipseproduct",
        "readme":"E:\\readme",
        "removedconf.txt":"E:\\removedconf.txt",
        "plugins":"E:\\plugins"
    }
}
```

The processing flow and features of the teachings presented herein for content services are now discussed with reference to a series of figures for an example implementation using Google Wave®. Various screenshots are presented while discussing the features and processing flow. It is noted that the Google Wave® implementation is shown for purposes of illustration and comprehension and is not intended to limit the teachings presented herein to any specific implementation, as a variety of other toolkits or systems can be used to effectuate the teachings presented herein.

Figure 2:
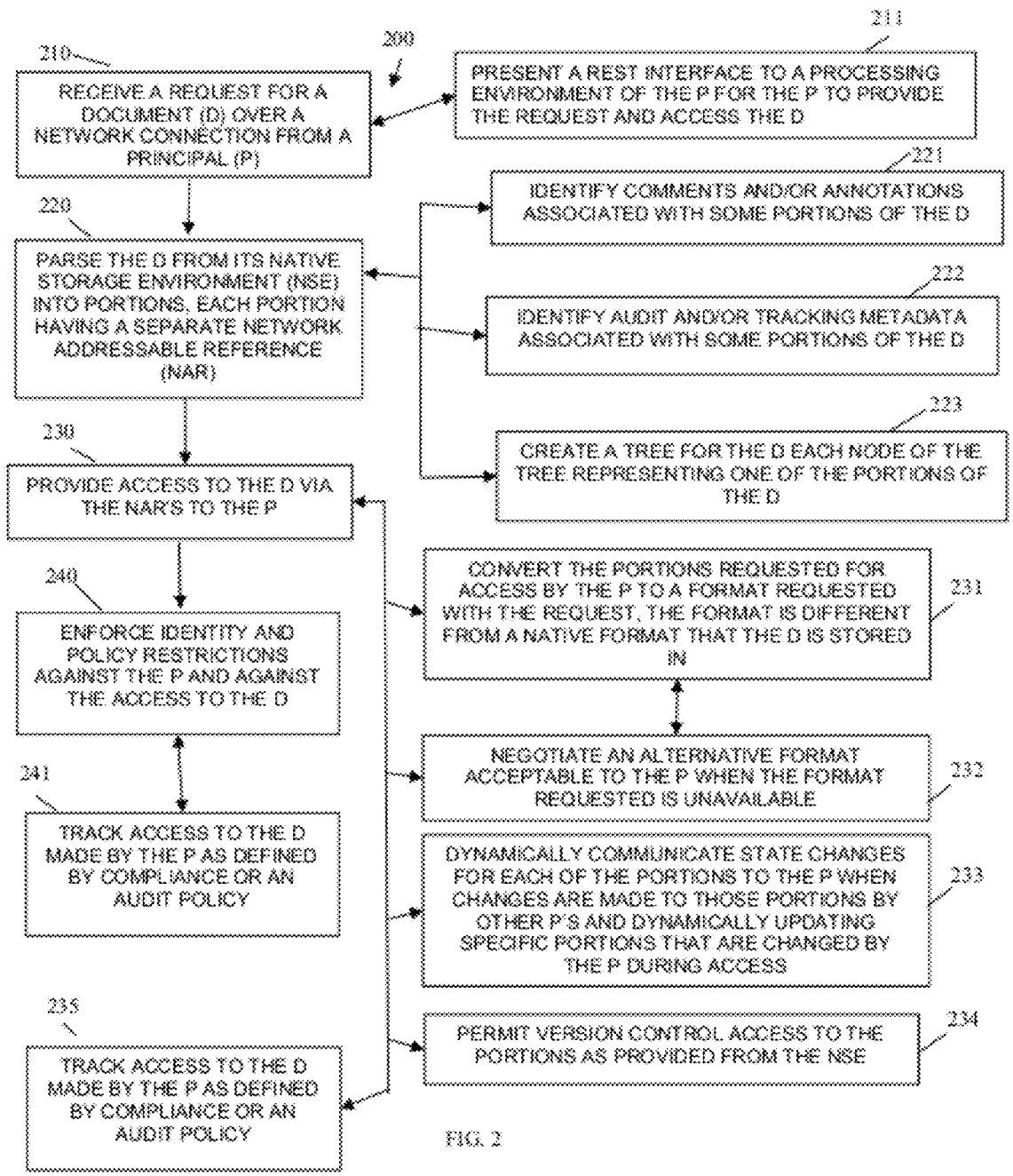
FIG. 2 is a diagram of a method for collaborative content services according to an example embodiment.

FIG. 2 is a diagram of a method 200 for collaborative content services according to an example embodiment. The method 200 (hereinafter referred to as "content server service") is implemented within and resides within a non-transitory computer-readable storage medium and executes on one or more processors of a network. The network can be wired, wireless, or a combination of wired and wireless.

The content server service is presented from the processing perspective of the RESTful server described above with reference to the system 100 of the FIG. 1. Multiple collaborating clients interact with the content server service over a network to collaborate on content sharing and authoring.

At 210, the content server service receives a request for a document over a network connection from a principal. The principal can be a user or an automated program/application. The document is a logical piece of content, such as a file. The request is for collaborating on content associated with the document.

According to an embodiment, at 211, the content server service presents a RESTful interface to a processing environment of the principal. This is done for the principal to provide the request and for the principal to access the document in a collaborative manner.

At 220, the content server service parses the document from its native storage environment into portions. Each portion has a separate network addressable reference. So, a document can be parsed into local components, such as chapter, section, paragraph, sentence, etc. In fact, any level of desired granularity can be achieved via the parsing. Each logical portion or component of the document is assigned an addressable reference so that the principal can directly action just a desired portion of the document.

In an embodiment, at 221, the content server service identifies comments and/or annotations associated with some portions of the document. Thus, each portion of the document can include primary content and secondary content; the primary content is actual authored content for the document whereas the secondary content can be such things as user comments and/or annotations. Both primary and secondary content are provided and managed via the portions.

In another situation, at 222, the content server service identifies audit and/or tracking metadata associated with some portions of the document. So, not only is user authored secondary content provided with portions of the document but service generated or maintained content can be maintained, such as audit and tracking information (e.g., identity of user accessing a portion of the document, date and time access was made, length of time access was made, and the like).

In still another case, at 223, the content server service creates a tree for the document where each node of the tree represents one of the portions of the document. Thus, the portions are all logically related to one another to form a document tree.

According to another situation, at 224, the content server service converts the portions requested for access by the principal into a format requested with the request. That is, the format requested by the principal is different from a native format that the document is stored in within its native storage environment.

Continuing with the embodiment of 224 and at 225, the content server service negotiates an alternative format that is acceptable to the principal when the format initially requested by the principal is unavailable. So, if the principal wants PDF but PDF is not supported a negotiation with the principal or with a service of the principal can be achieved to ensure an acceptable format for the portion of the document requested can be made available to the principal for collaborative access.

At 230, the content server service provides access to the document via the network addressable references to the principal. The necessary native file system commands are hidden from the principal and access is transparently achieved from the perspective of the principal via the portions requested and in a format requested by the principal.

According to an embodiment, at 231, the content server service dynamically communicates state changes for each of the portions of the document to the principal when changes are made to those portions by other principals that are also dynamically and collaboratively accessing the portions. Additionally, the content server service dynamically updates specific portions that are changed by the principal during access within the native storage environment.

In a particular situation, at 232, the content server service permits version control access to the portions. The version control access is provided from the native storage environment. So, the version control mechanism that operates within the native storage environment is enforced during version control access to the portions.

In yet another scenario, at 233, the content server service adds new comments or new annotations to specific portions of the document as supplied by the principal during access to the document. In other words, the principal can collaborative added comments and annotations to specific portions of the document and they are maintained from the native storage environment of the document via the content server service.

At 240, the content server service enforces identity and policy restrictions against the principal and against the access made by the principal to the portions and thereby to the document. Again, native storage environment identity and policy-based restrictions and services are enforced against the principal and the access to the portions of the document.

In an embodiment, at 241, the content server service also tracks access to the document made by the principal. The tracking and information collected is defined by a compliance and/or an audit policy.

Figure 3:
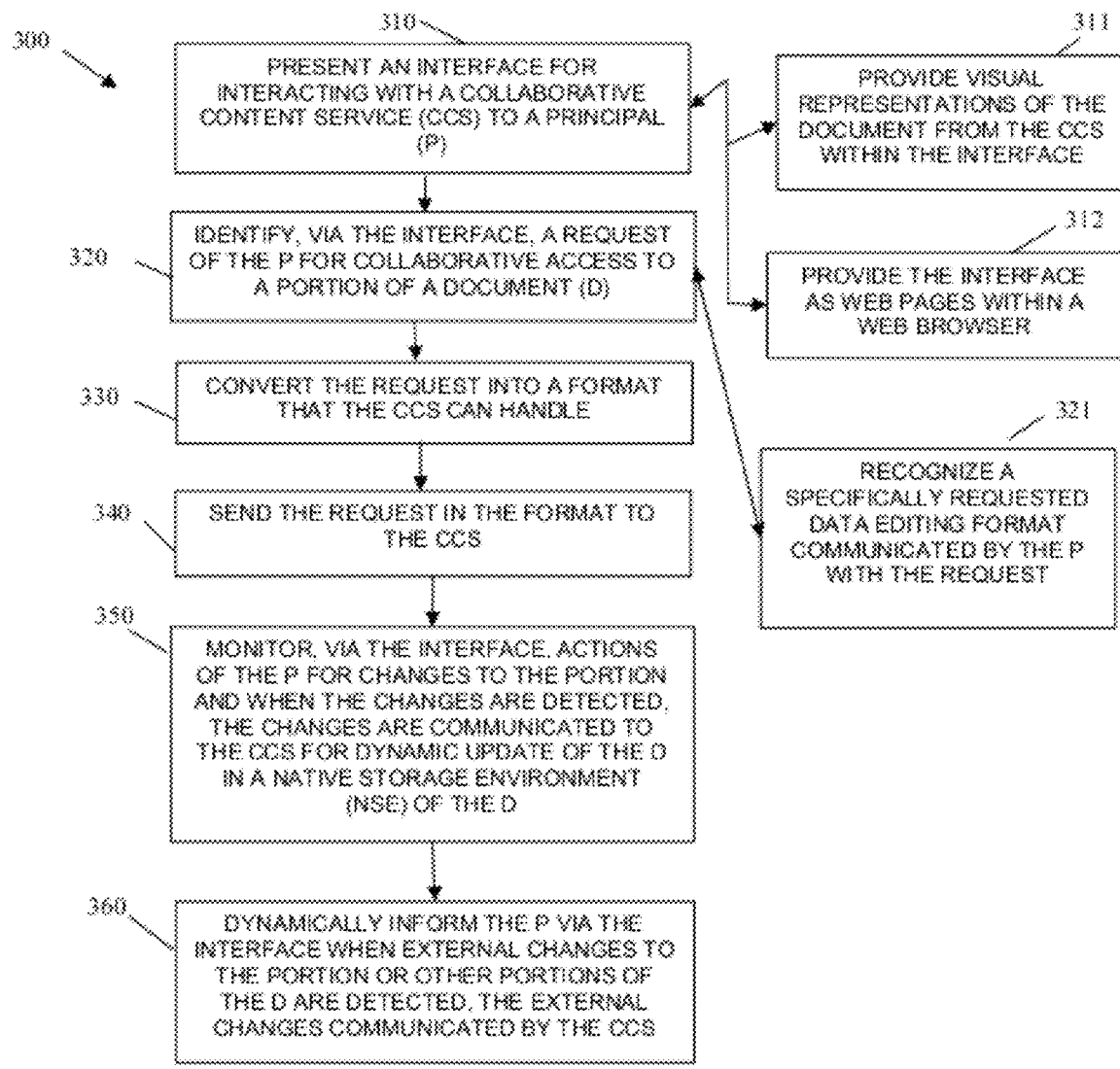
FIG. 3 is a diagram of another method for collaborative content services, according to an example embodiment.

FIG. 3 is a diagram of another method 300 for collaborative content services, according to an example embodiment. The method 300 (hereinafter "client-side collaboration service") is implemented within and resides within a non-transitory computer-readable storage medium and executes on one or more processors of a network. The network may be wired, wireless, or a combination of wired and wireless.

The client-side collaboration service is presented from the processing perspective of a client accessed or used by a principal that desires to collaborate on content. The interaction of the client-side collaboration service occurs with the content server service (described above with reference to the method 200 of the FIG. 2).

At 310, the client-side collaboration service presents an interface for interacting with a collaborative content service to a principal. The collaborative content service may be viewed as the content server service discussed above with reference to the method 200 of the FIG. 2.

According to an embodiment, at 311, the client-side collaboration service provides visual representations of the document from the collaborative content service within the interface.

In one case, at 312, the client-side collaboration service provides the interface as a series of web pages rendered within a web browser of a principal.

At 320, the client-side collaboration service identifies, via the interface, a request of the principal for collaborative access to a portion of a document. So, the interface may present the document as a series of decomposed or parsed portions (as discussed above with reference to the method 200 of the FIG. 2). The principal interacts with the interface to select or make a request for collaborative access to a specific portion of the document.

In an embodiment, at 321, the client-side collaboration service recognizes a specifically requested data editing format communicated by the principal with the request. In other words, the principal can select a desired editing format to access the portion of the document. This format can be in a same or sometimes different format from how the document is natively stored and managed by the collaborative content service.

At 330, the client-side collaboration service converts the request into a format that the collaborative content service can handle and process. So, transparent to the principal, the request is formatted into commands and operations understood by the collaboration content service.

At 340, the client-side collaboration service sends the request in the format to the collaborative content service for processing.

At 350, the client-side collaboration service monitors, via the interface, actions of the principal for changes to the portion of the document when changes are detected. Any changes made by the principal to the portion are dynamically and in real time communicated to the collaborative content service for dynamic update of the document in the native storage environment of the document.

According to an embodiment, at 360, the client-side collaboration service dynamically informs the principal, via the interface, when external changes to the portion or other portions of the document are detected. The external changes are communicated by the collaborative content service. So, other principals can be dynamically modifying the same portion as the principal or other portions of the document and when changes are detected the principal is notified of any such changes and updates occurring in the native storage environment of the document.

Figure 4:
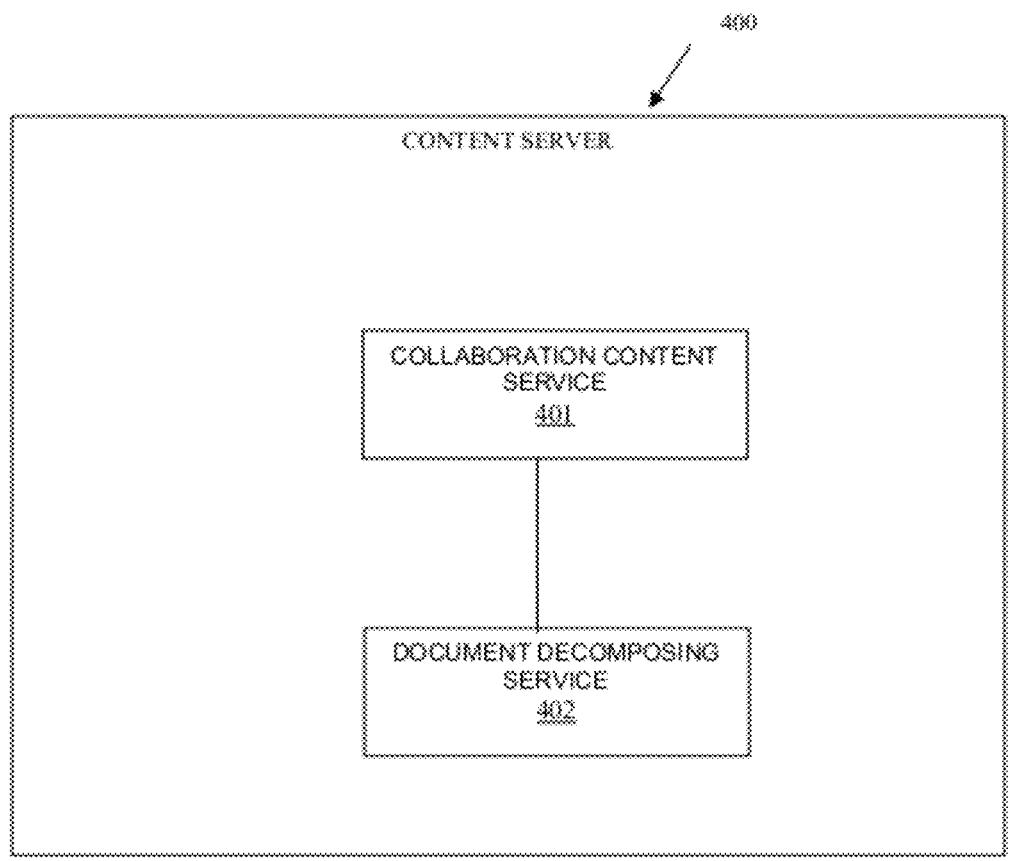
FIG. 4 is a diagram of another content service system, according to an example embodiment.

FIG. 4 is a diagram of another content service system 400, according to an example embodiment. The content service system 400 is implemented in a non-transitory computer-readable storage medium and executes on one or more processors of a network. The network may be wired, wireless, or a combination of wired and wireless. In an embodiment, the content service system 400 implements among other things the processing associated with the method 200 of the FIG. 2.

The content service system 400 includes a content server (one or more processors) configured with a collaboration content service 401 that executes on the content server. The content server is also configured with a document decomposing service 402 that executes on the content server.

The collaboration content service 401 is configured to interact with multiple clients over the network to deliver access to portions of documents from a native storage location for the documents.

The document decomposing service 402 is to decompose the documents into portions and make those portions accessible via independent addressable references to the portions.

In an embodiment, the collaboration content service 401 is further configured to enforce access restrictions, identity restrictions, and policy restrictions defined in the native storage location against access to the portions of the documents.

According to an embodiment, the document decomposing service 402 is also configured to supply metadata with each of the portions during access to the portions of the documents. In some cases, the metadata includes auditing information, identity information, comment information, and/or annotation information.

Figure 5:
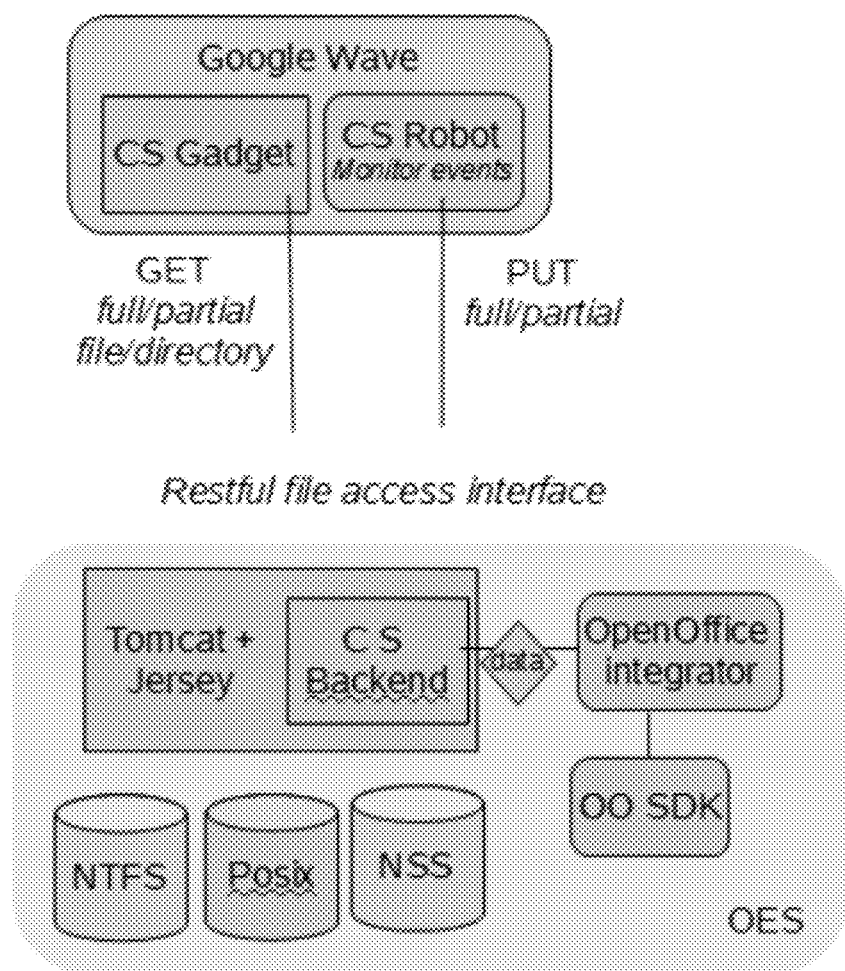
FIG. 5 is a diagram of components for a content service system using a Google Wave® toolkit, according to an example embodiment.

FIG. 5 illustrates components for a content service system using a Google Wave® toolkit. Again, this is presented for illustration only and is not intended to limit the teachings herein to the specific toolkit provided in the FIG. 5.

Client Side (Identified by CS in the FIG. 5)

A web application that can send an HTTP packet to the Content server.

Any web site/web based applications like Google Wave®, gmail, Facebook®, and/or Twitter® can serve as the client. A plugin is provided to pull data and generate simple HTTP requests.

In the FIG. 5 Google Wave® is presented as the front end client application. For Google Wave® a gadget and a robot are provided in the sample illustration. The gadgets help with publishing content while the robots help with authoring content.

Server side

There are two layers: web service Interface and back end service layer.

Web Service Interface

Functions of this component include HTTP packet handling and content negotiation.
HTTP Packet Handling This is a Java based web application running on a tomcat engine with a jersey framework to implement HTTP packet handling like parsing the header and body and extracting the information from various headers: MIME types, etc.
Content Negotiation The requested MIME type is analyzed and checked for feasibility. If feasible the request is sent to service layer.

Back-End Service Layer

This includes: data format conversion; conversion to a specific format requested; parsing of data in the case of partial file and particular content is fetched from the file; file system access; and based on the file path provided or passed, the file system is accessed and file operations performed, such as read, write, and/or modification of the data; the data is saved to the file and access is then closed.

FIGS. 6-17 show some example screen shots for the Google Wave® sample implementation.

Example Google Wave® Screen Shots

The following processing results are portrayed in the associated screen shots of FIGS. 6-17.

Figure 6:
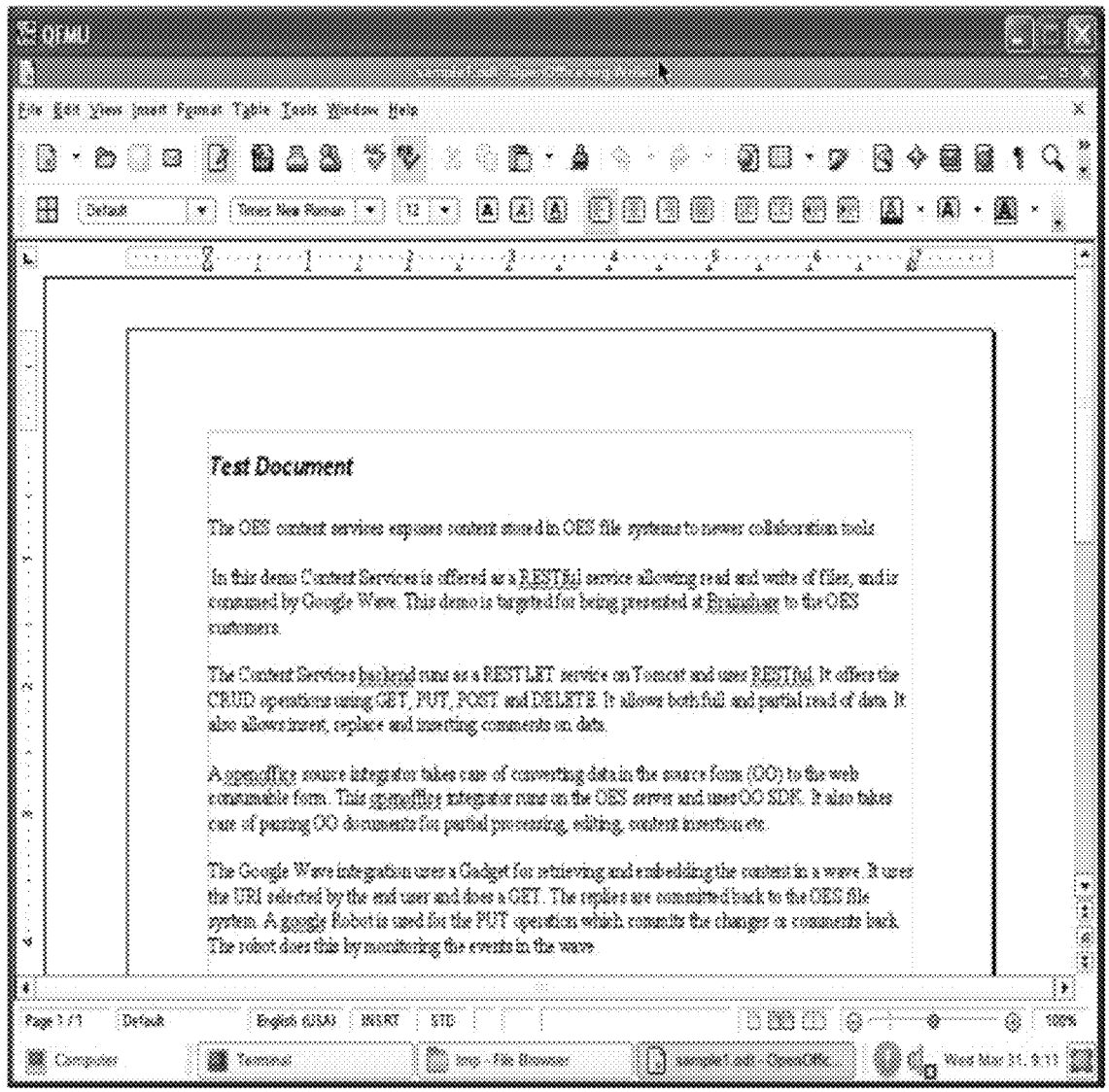
FIGS. 6-17 show some example screen shots for the Google Wave® sample implementation provided in the FIG. 5.
Figure 7:
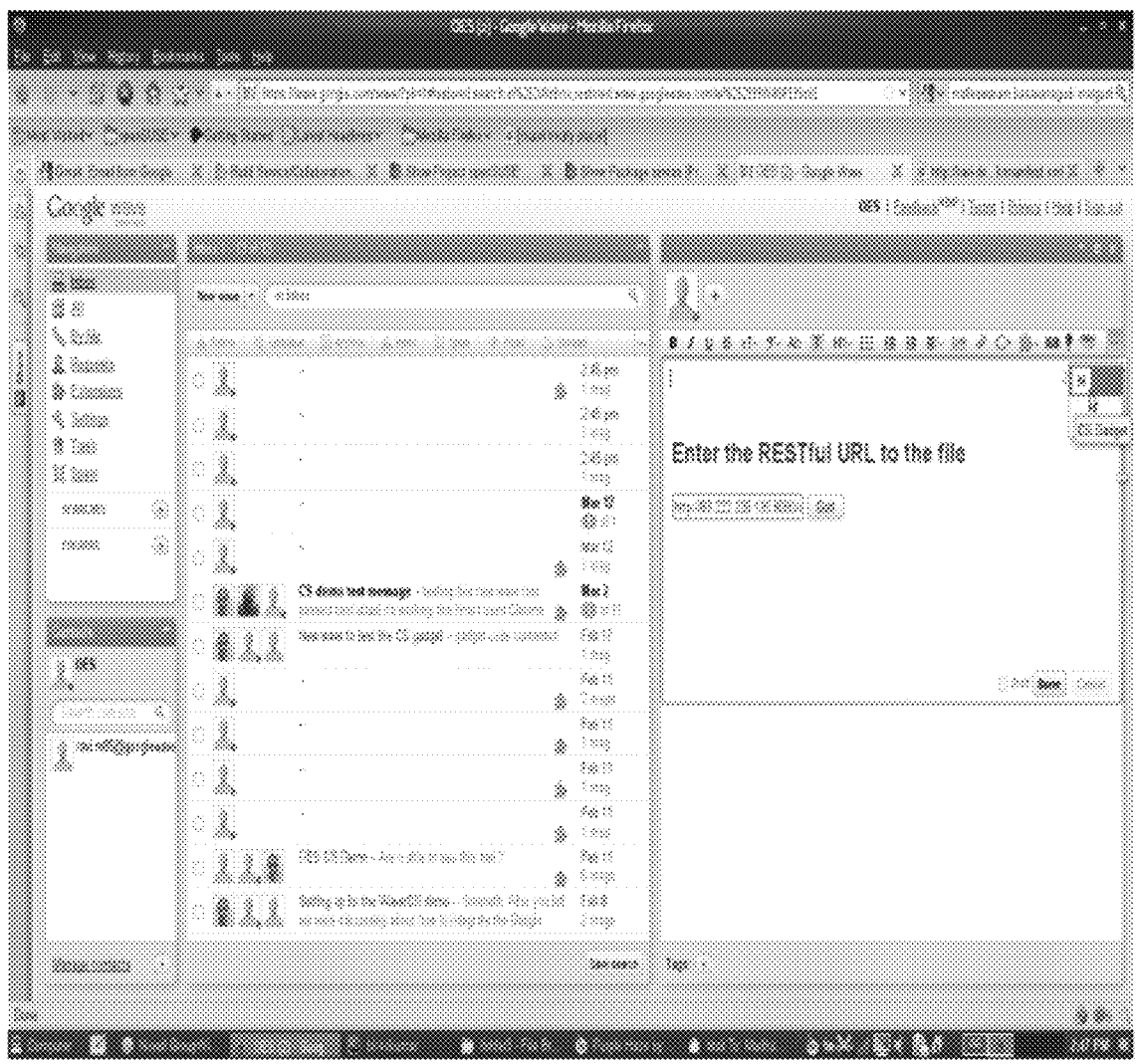
Figure 8:
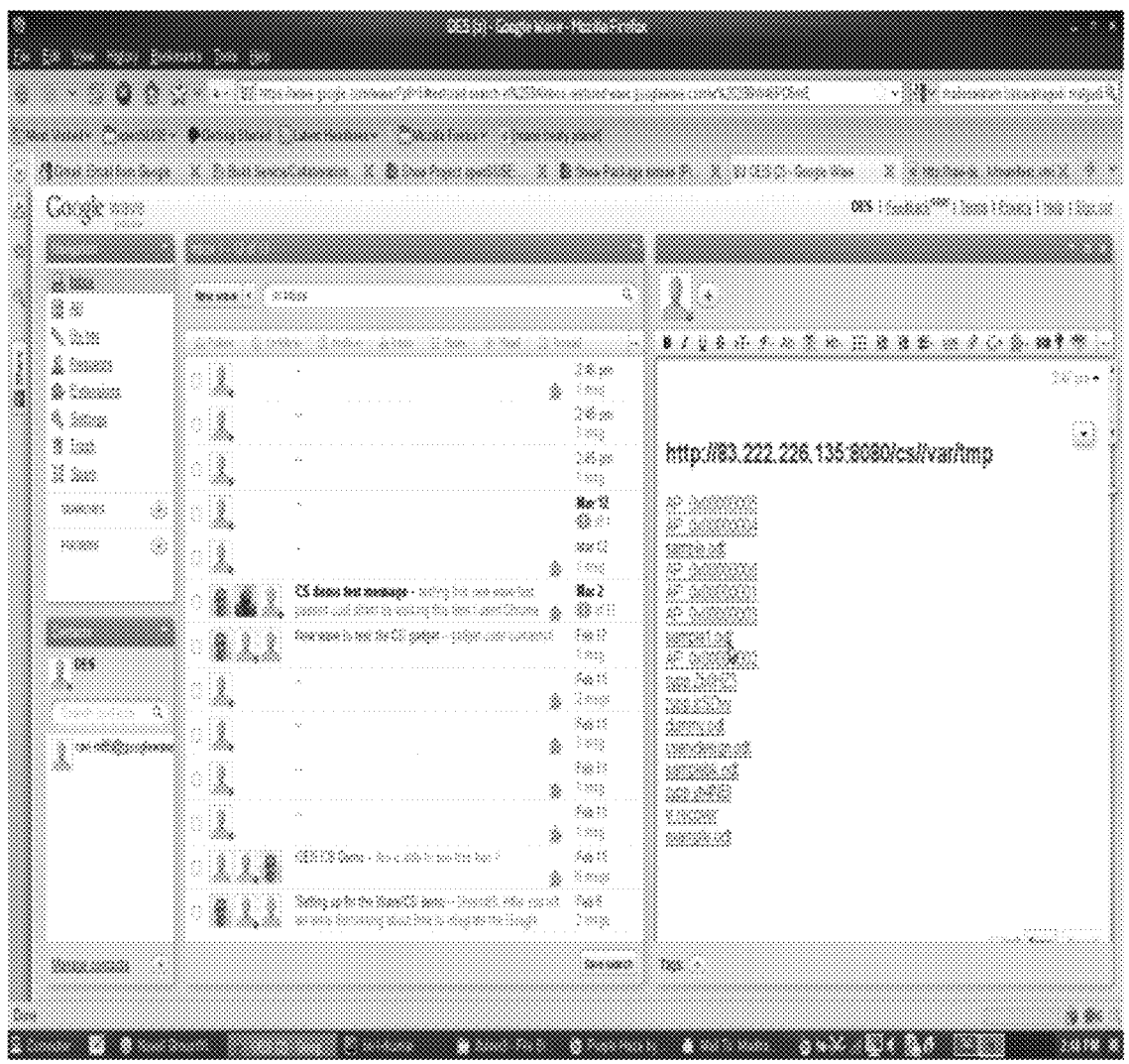
Figure 9:
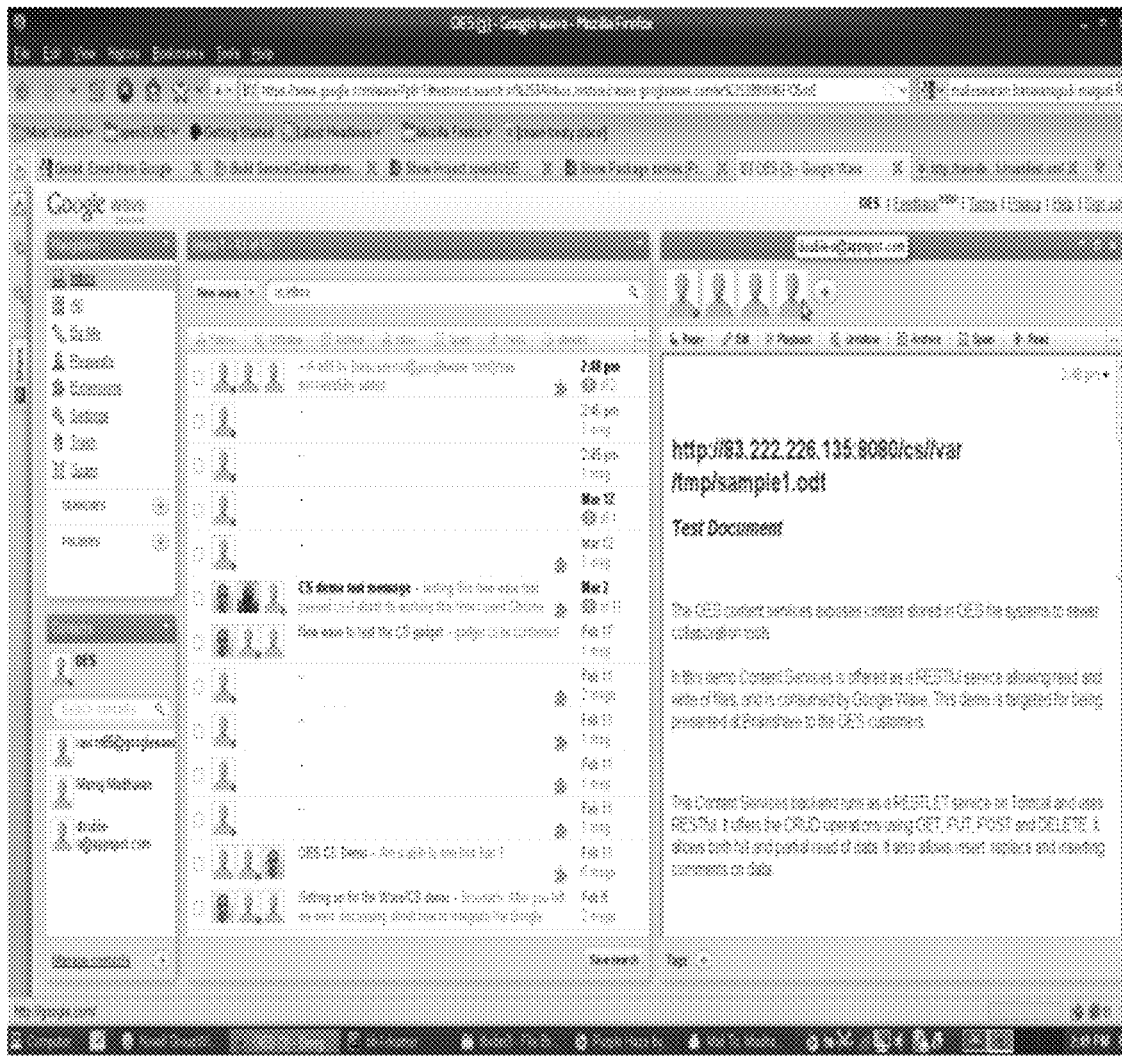
Figure 10:
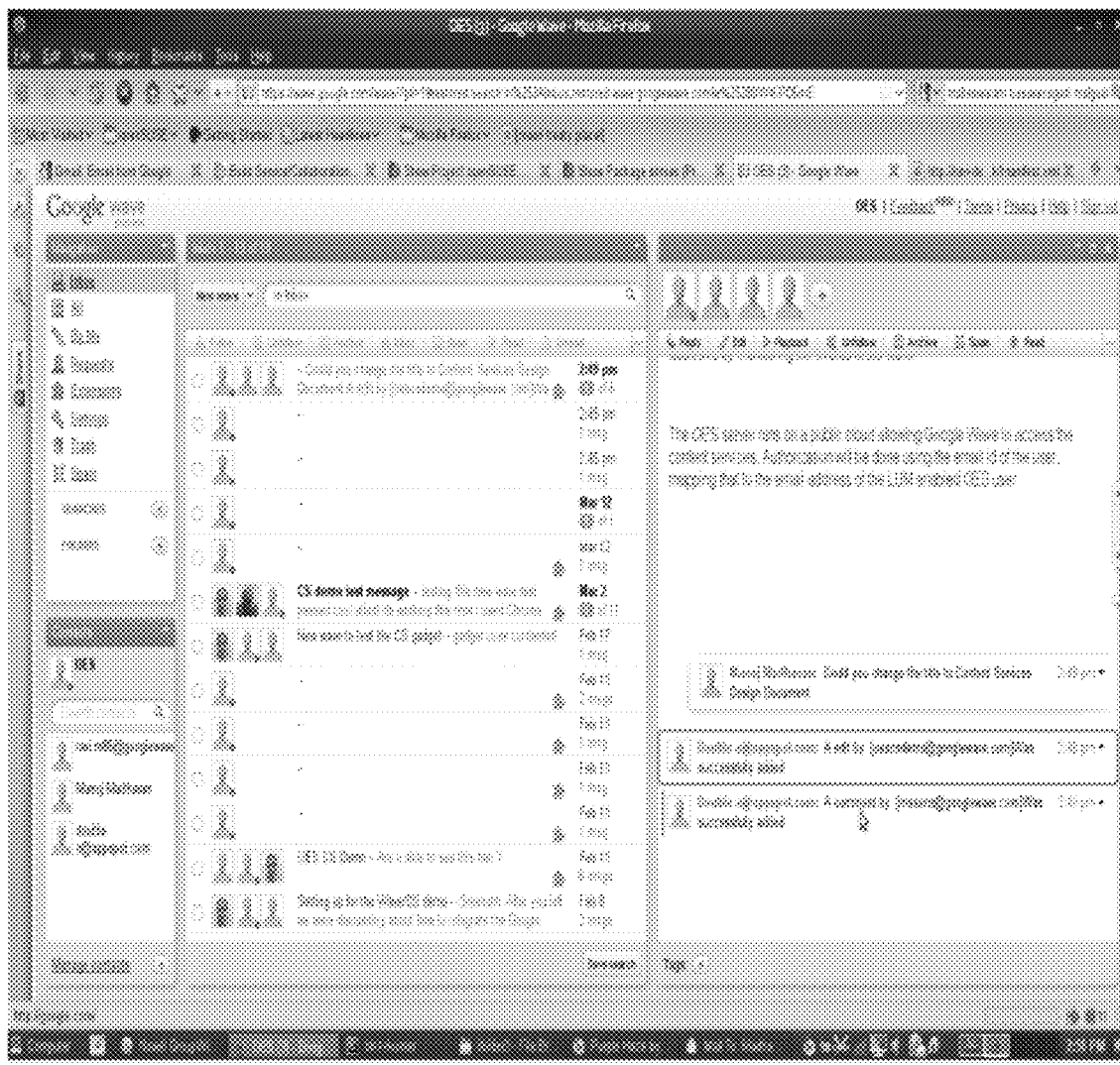
Figure 11:
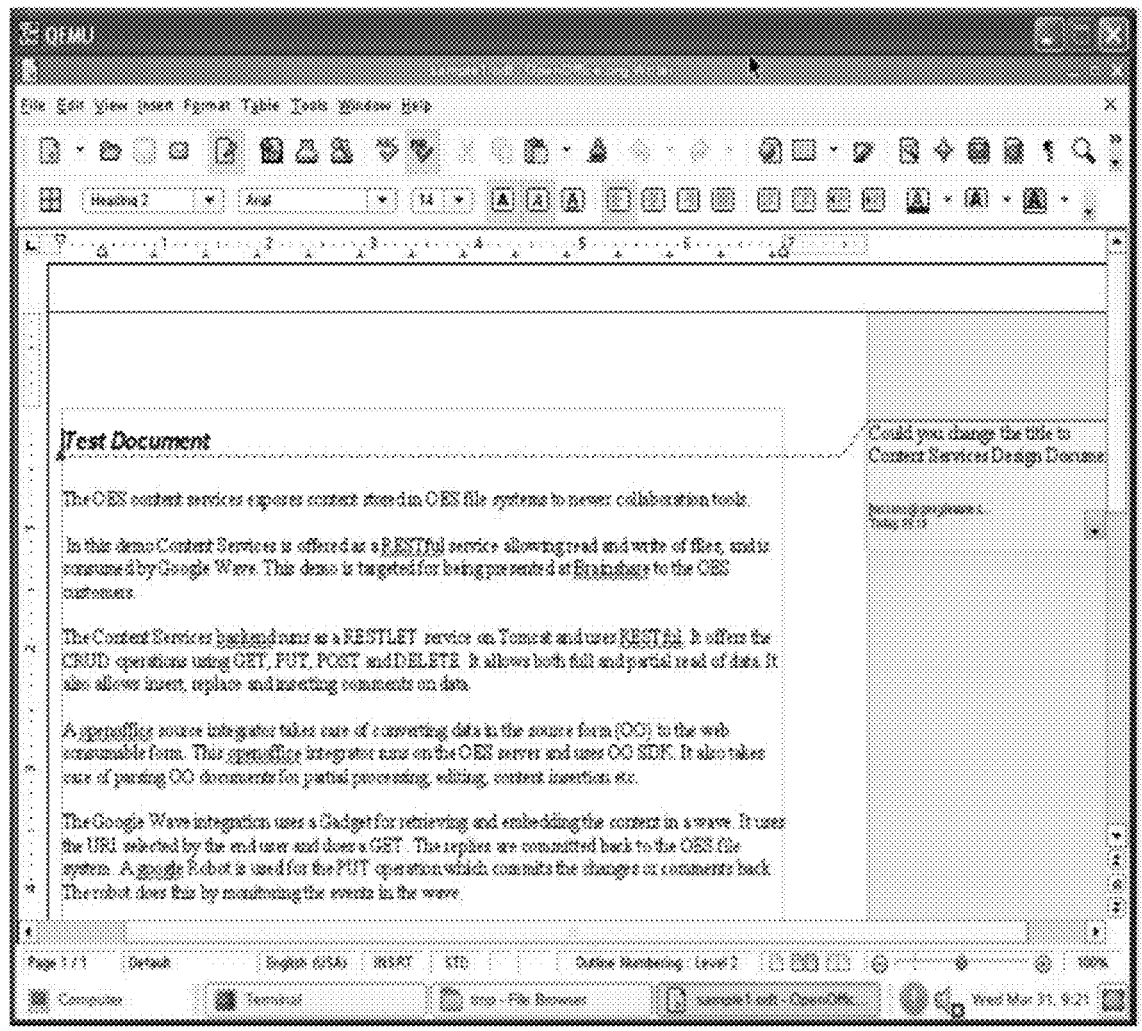
Figure 12:
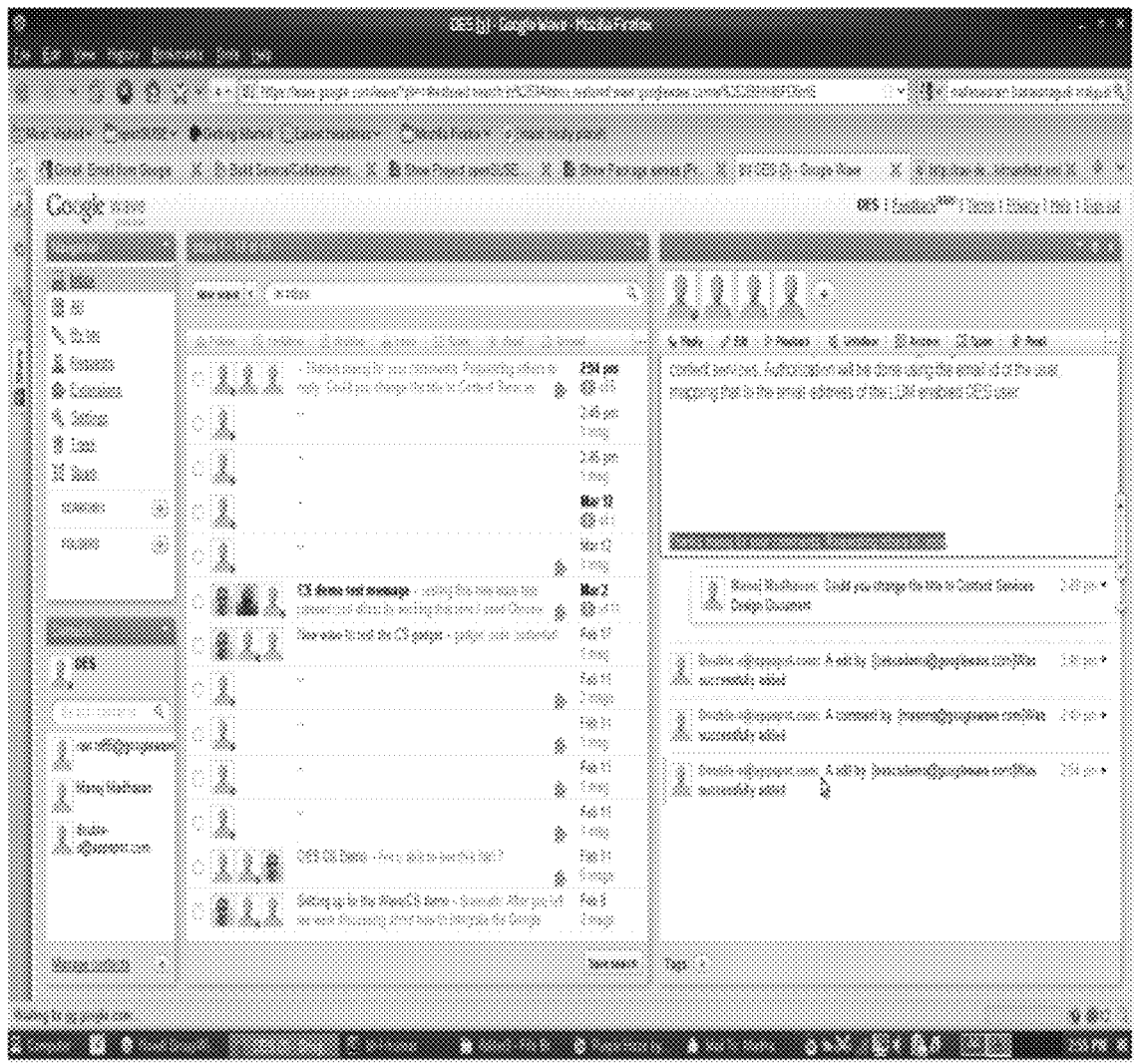
Figure 13:
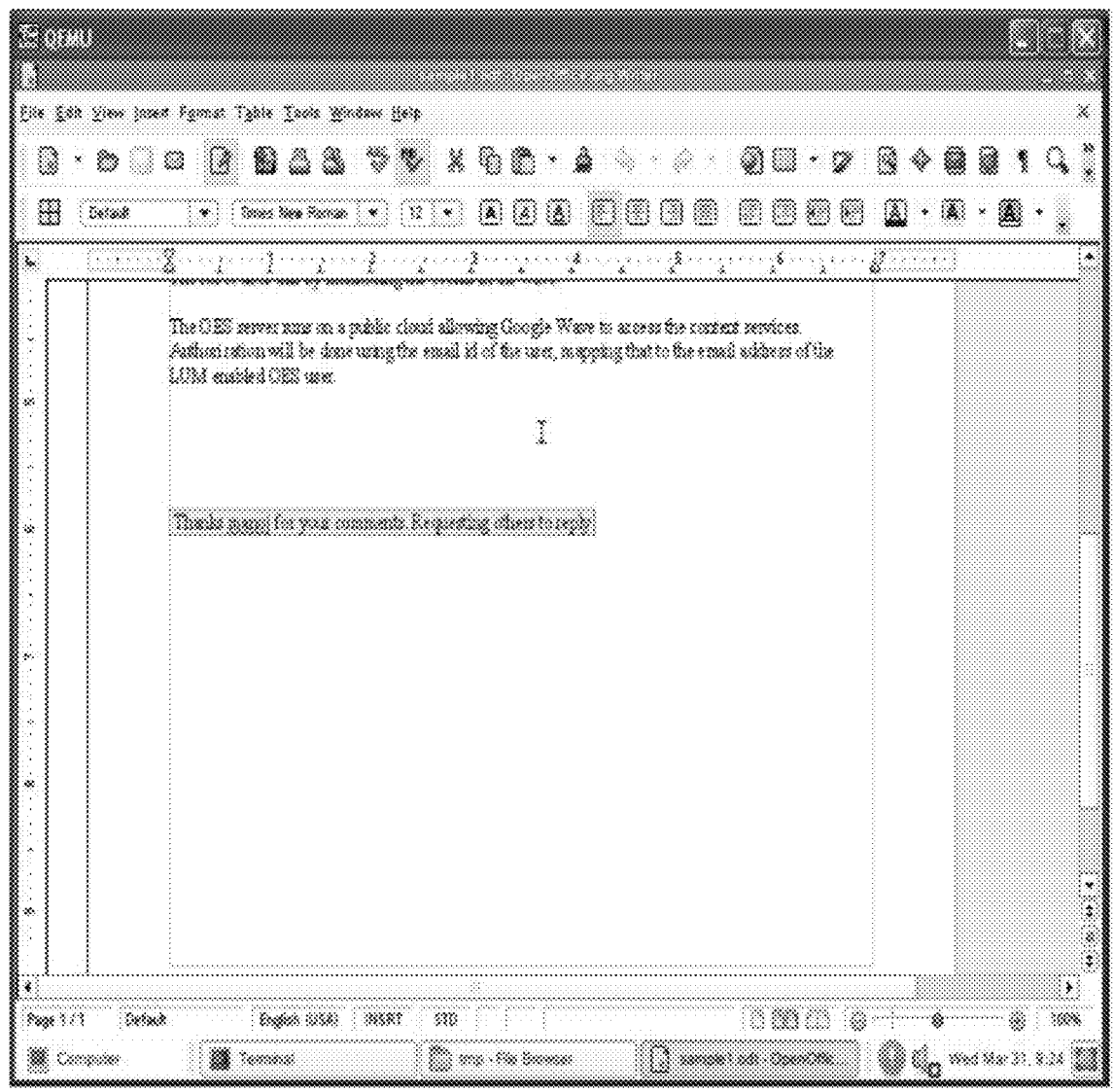
Figure 14:
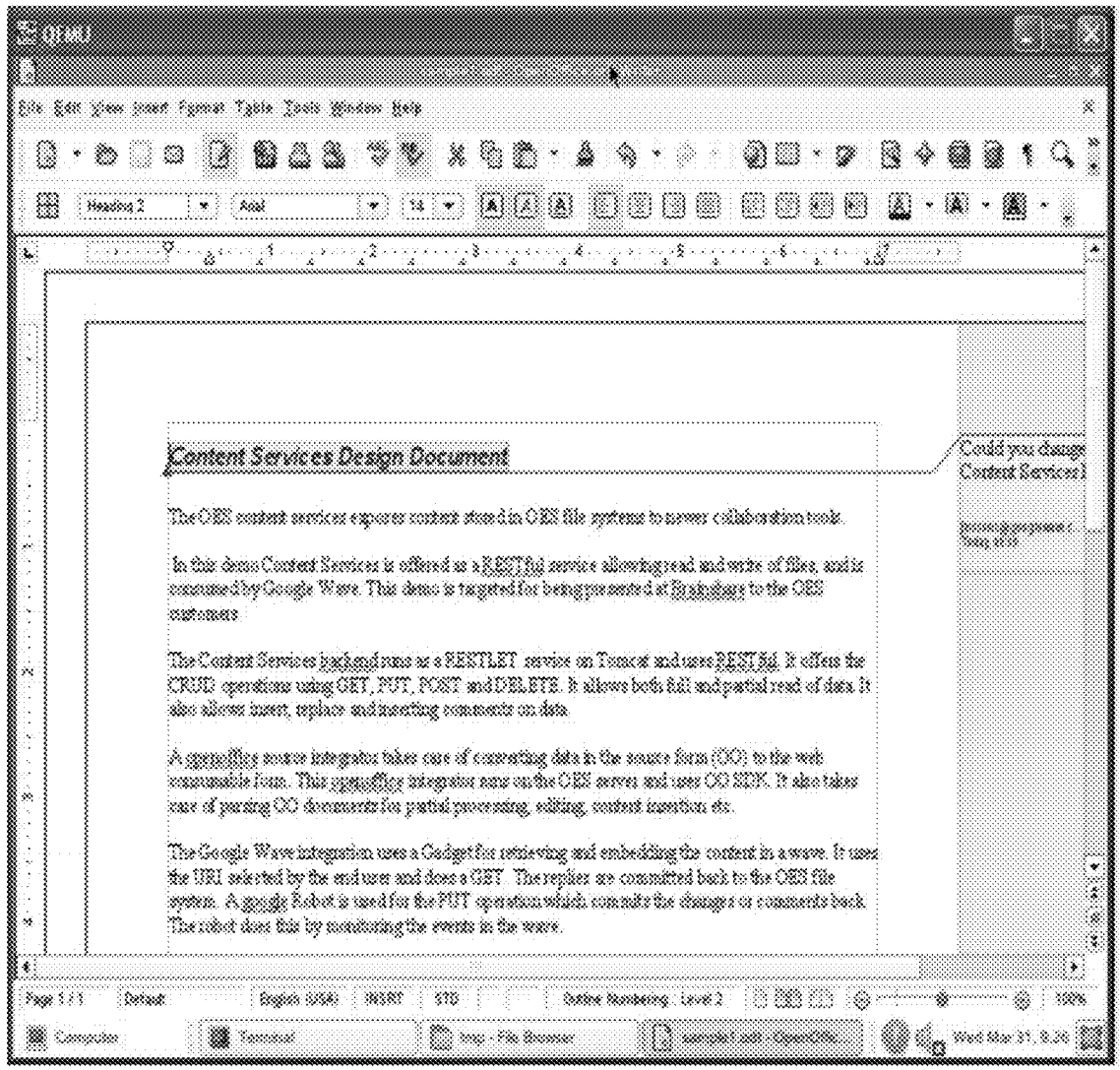
Figure 15:
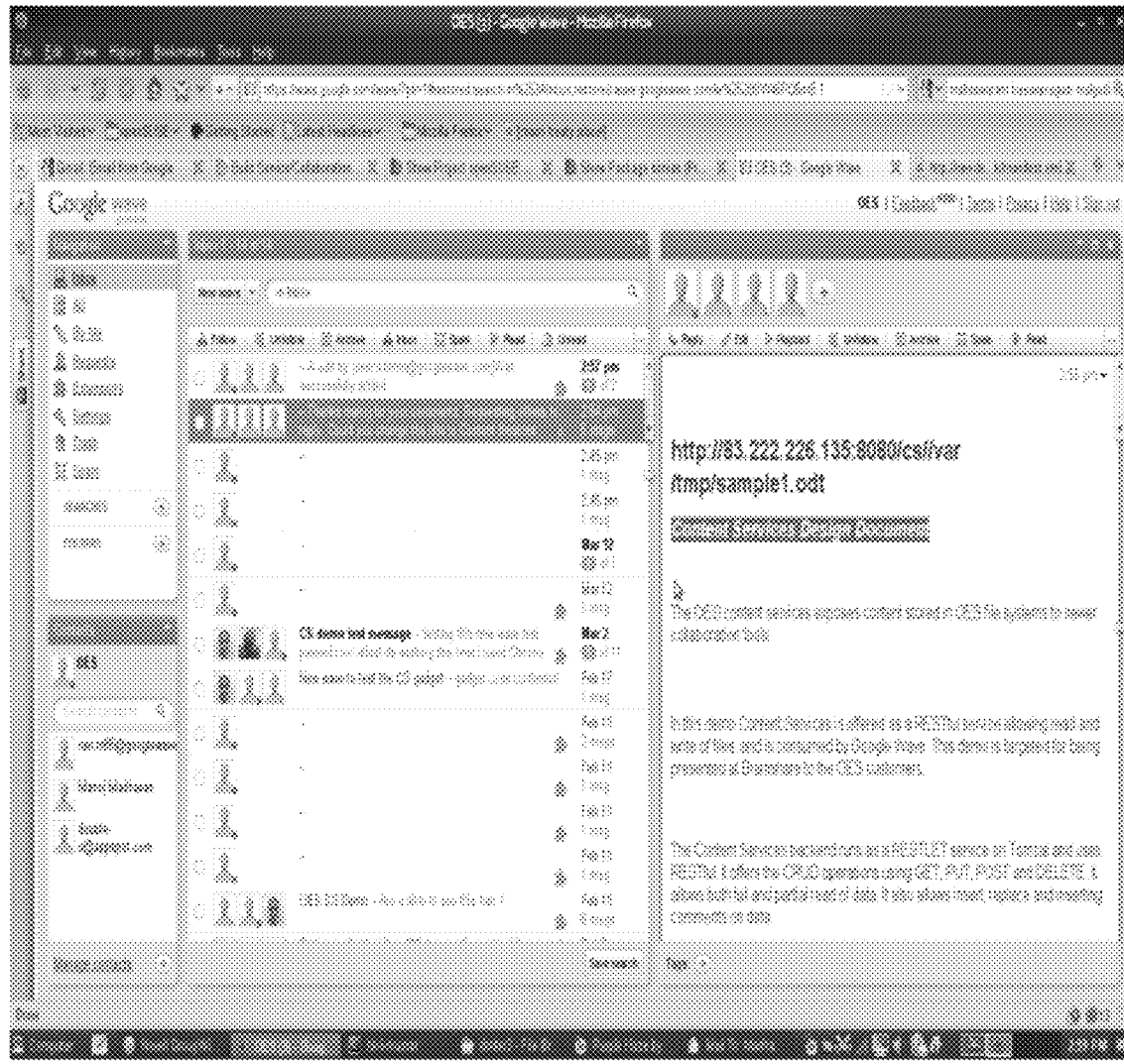
Figure 16:
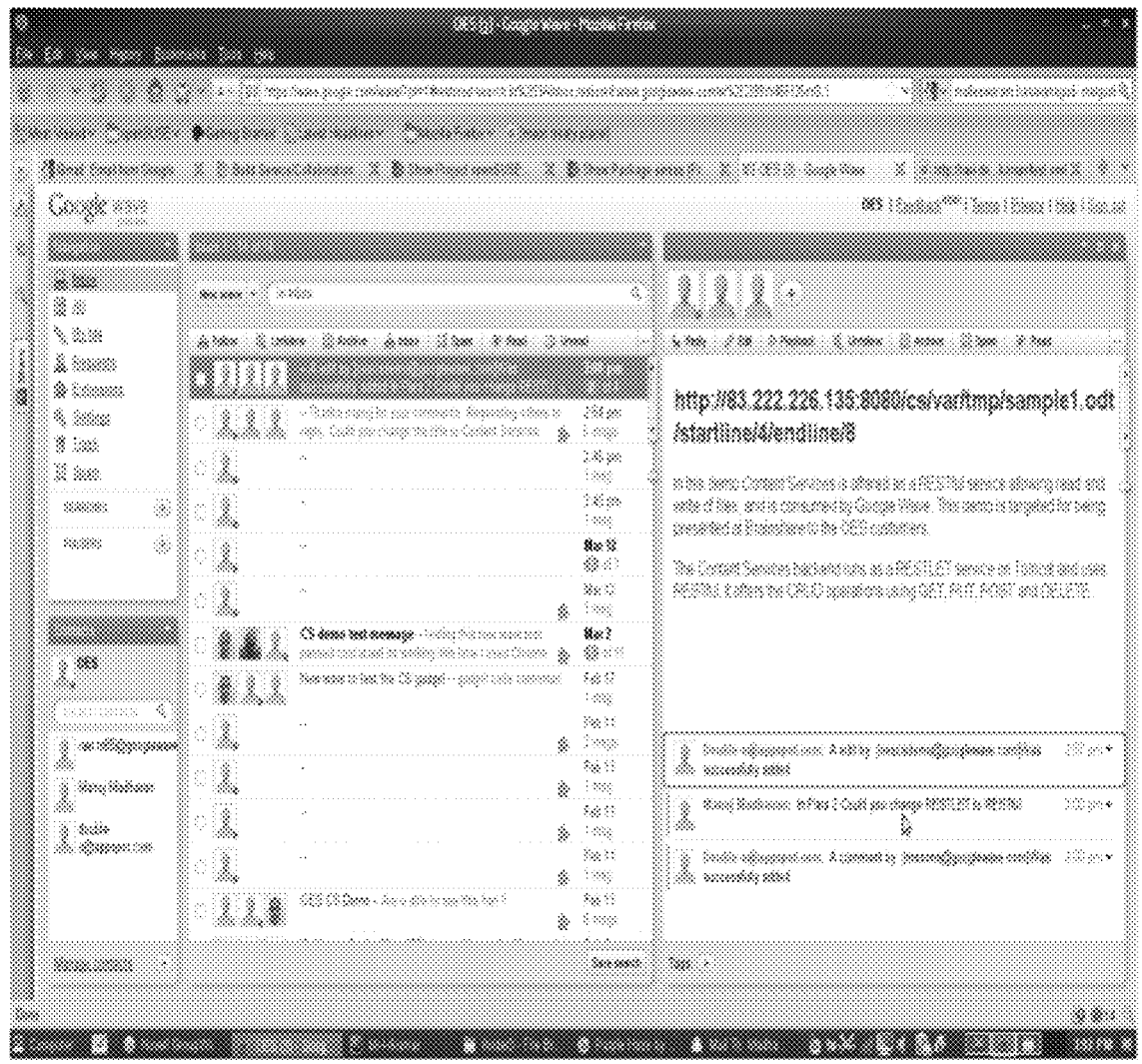
Figure 17:
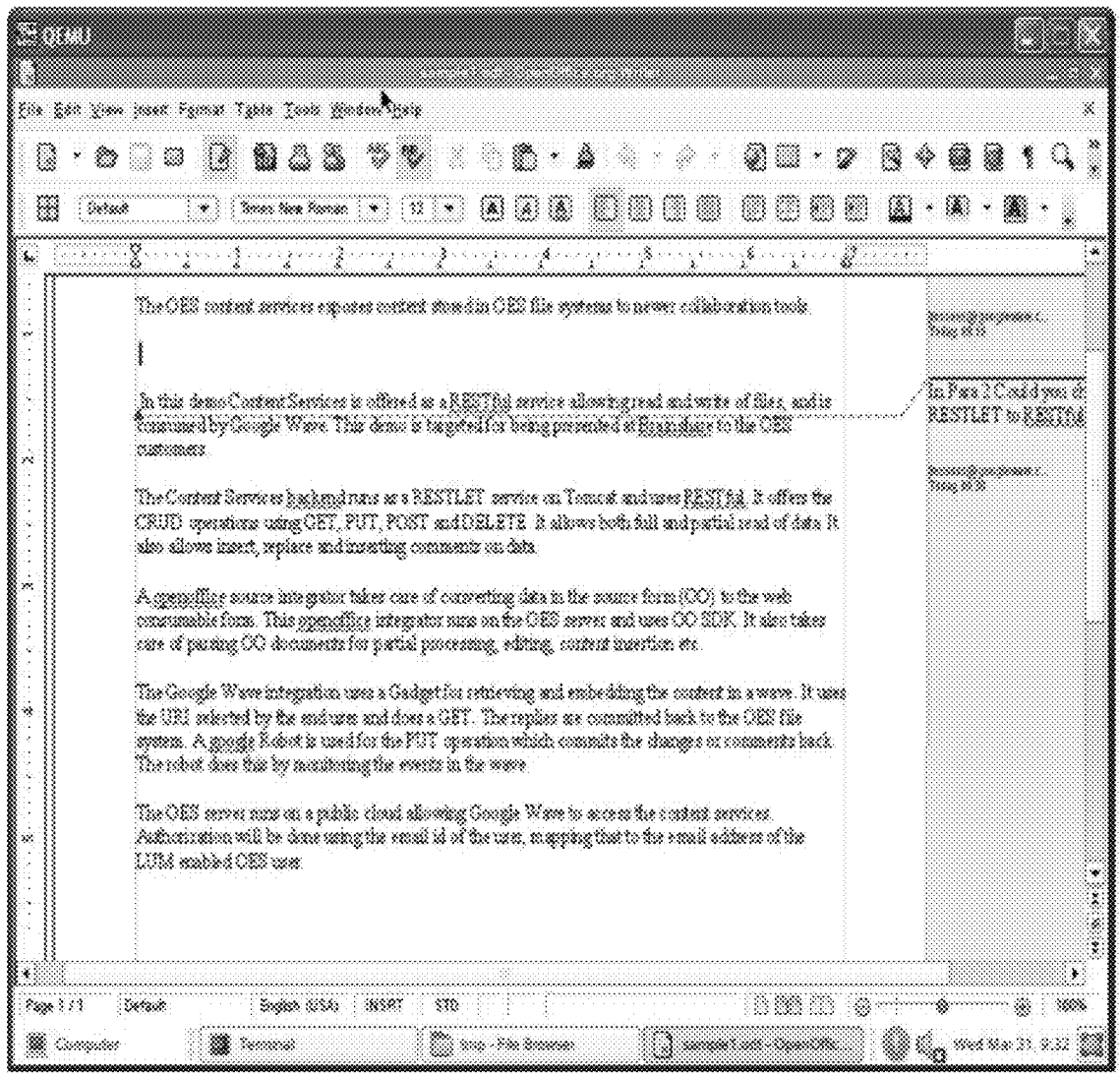

FIG. 6 shows the original document on the server (using VNC to the server);

FIG. 7 adds a Novell CS gadget;

FIG. 8 browses the directory structure;

FIG. 9 shows the file, which is selected for the wave;

FIG. 10 shows a reply from a user and a robot's return value;

FIG. 11 shows a comment on the document;

FIG. 12 shows an edit to the wave and shows a robot's return value;

FIG. 13 shows the edited file—appended;

FIG. 14 shows an update to the document;

FIG. 15 shows the updated wave;

FIG. 16 shows the wave with a partial fetch and a reply with a robot's return value; and FIG. 17 shows comments on file.

It is now appreciated how the teachings presented herein provide for a variety of beneficial improvements to the collaborative content services. For example, the teachings:

1) allow applications, including collaboration and browser based applications, to access data using a REST interface using a finer granularity than just file boundaries;

2) allow clients to access data formatted as they need it rather than being forced to deal with data as it is stored;

3) re-architect data access as information access rather than file access;

4) support, but not require, every client to have software to understand every data format and/or file access protocol;

5) allow multiple clients to share and edit documents in a way that is natural to collaborative web applications rather than the native methods associated with the data format, so, a team can edit a common document even if one person is used to using MS Word while another is used to using OpenOffice while still another is used to working only with text files using something like VI on Linux or Notepad on Windows;

6) allow all users to use a simple "post and comment" metaphor for collaboration;

7) retain all of the benefits of enterprise data and storage management (backup, anti-virus, active monitoring, replication, intelligent location, multi-tiered access, security, policy, compliance, etc) with the convenience of accessing information rather than copying information into application specific data repositories; and 8) support identity, policy, and compliance in all operations and so only data is accessed that is allowed to be accessed (or modified, or processed, etc).

It is also noted that the teachings presented herein provided for a variety of practical benefits in the industry, such as:

1) since the data from various client sources like Twitter®, Facebook®, email services etc. can be collected and centrally stored to a file system, data mining services can be deployed over the files to generate synthesized information, so if a poll is conducted in Facebook®/Twitter® with 4 options to answer for a question posed, since the options selected by various category of users are stored in one file, the results can be compared with data mining services and driver information;

2) similarly one can collect comments/data from various users in the client application and save it to a file so unstructured data classification services can be effectively used; and 3) content services can be integrated to a work flow engine so that one can store as well send data to other systems in the business process that are people driven; for example, say one is in a business where one has to serve his/her clients (business partners) working in different platforms and collaboration tools, e.g. one is in Google Wave® another is in Twitter® and another in Facebook®; one can have accounts in all these platforms to get in touch with them but it's hard for one person to monitor multiple collaboration tools and respond quickly; in such case, one can use the content services provided herein to collect user requests from all these tools and send it via even an email to the end user.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method implemented and residing within a non-transitory computer-readable storage medium that is executed by one or more processors of a network to perform the method, comprising:
   receiving a request for a document over a network connection from a principal;
   parsing the document from its native storage environment into portions, each portion having a separate unique and independent network addressable reference, wherein some of the independent network addressable references are inode based and other of the independent network addressable references are path based;
   providing access to the document via the network addressable references to the principal, wherein the principal can directly access a particular portion using a particular network addressable reference; and
   enforcing identity and policy restrictions against the principal and against the access to the document, and wherein enforcing further includes enforcing a local policy restriction against the access ensuring that the local policy restriction for an environment of the principal is within global policy restrictions and obtaining an identity for the principal from a federation of identity providers.

2. The method of claim 1, wherein receiving further includes presenting a Representational State Transfer (REST) interface to a processing environment of the principal for the principal to provide the request and access the document.

3. The method of claim 1, wherein parsing further includes identifying comments and/or annotations associated with some portions of the document.

4. The method of claim 1, wherein parsing further includes identifying audit and/or tracking metadata associated with some portions of the document.

5. The method of claim 1, wherein parsing further includes creating a tree for the document each node of the tree representing one of the portions of the document.

6. The method of claim 1, wherein providing further includes converting the portions requested for access by the principal to a format requested with the request, the format is different from a native format that the document is stored in.

7. The method of claim 6, wherein converting further includes negotiating an alternative format acceptable to the principal when the format requested is unavailable.

8. The method of claim 1, wherein providing further includes dynamically communicating state changes for each of the portions to the principal when changes are made to those portions by other principals and dynamically updating specific portions that are changed by the principal during access.

9. The method of claim 1, wherein providing further includes permitting version control access to the portions as provided from the native storage environment.

10. The method of claim 1, wherein providing further includes adding new comments or new annotations to specific portions of the document as supplied by the principal during access to the document.

11. The method of claim 1, wherein enforcing further includes tracking access to the document made by the principal as defined by a compliance or an audit policy.

12. A method implemented and residing within a non-transitory computer-readable storage medium that is executed by one or more processors of a network to perform the method, comprising:
   presenting an interface for interacting with a collaborative content service to a principal;
   identifying, via the interface, a request of the principal for collaborative access to a portion of a document, wherein the interface presents the document as a series of decomposed or parsed portions and the principal interacts with the interface to select or make a request for the collaborative access to the portion of the document, and wherein each portion is represented as a unique Uniform Resource Identifier and some portions are inode based and other portions are path based;
   converting the request into a format that the collaborative content service can handle;
   sending the request in the format to the collaborative content service;
   monitoring, via the interface, actions of the principal for changes to the portion and when the changes are detected, the changes are communicated to the collaborative content service for dynamic update of the document in a native storage environment of the document; and
   enforcing identity and policy restrictions when monitoring the actions and enforcing a local policy restriction against the access ensuring that the local policy restriction for an environment of the principal is within global policy restrictions and obtaining an identity for the principal from a federation of identity providers.

13. The method of claim 12 further comprising, dynamically informing the principal via the interface when external changes to the portion or other portions of the document are detected, the external changes communicated by the collaborative content service.

14. The method of claim 12, wherein presenting further includes providing visual representations of the document from the collaborative content service within the interface.

15. The method of claim 12, wherein presenting further includes providing the interface as web pages within a web browser.

16. The method of claim 12, wherein identifying further includes recognizing a specifically requested data editing format communicated by the principal with the request.

17. A multiprocessor-implemented system, comprising:
- a content server configured with a collaboration content service that executes on the content server; and
- the content server configured with a document decomposing service that executes on the content server;
- the collaboration content service is configured to interact with multiple clients over a network to deliver access to portions of documents from a native storage location for the documents, the document decomposing service is to decompose the documents into the portions and make the portions directly accessible the network via independent unique addressable references to the portions, wherein some of the independent unique addressable references are inode based and other of the independent unique addressable references are path based, and wherein the collaboration content service is configured to enforce identity and policy restrictions on access to the documents by enforcing local policies against the accesses and ensuring that local policy restrictions for environments of the clients are within global policy restrictions and obtaining identities for principals associated with the clients from a federation of identity providers.

18. The system of claim 17, wherein the document decomposing service is further configured to supply metadata with each of the portions during access to the portions of the documents.

19. The system of claim 18, wherein the metadata includes auditing information, identity information, comment information, and/or annotation information.

* * * * *